United States Patent [19]

Gutweiler

[11] Patent Number: 5,573,842

[45] Date of Patent: Nov. 12, 1996

[54] POLYVINYLBUTYRAL FILMS HAVING IMPROVED OPTICAL PROPERTIES

[75] Inventor: Matthias Gutweiler, Taunusstein, Germany

[73] Assignee: Hoechst Aktiengesellschaft, Frankfurt, Germany

[21] Appl. No.: 270,840

[22] Filed: Jul. 5, 1994

[30] Foreign Application Priority Data

Jul. 19, 1993 [DE] Germany .......................... 43 24 167.0

[51] Int. Cl.⁶ ................... B32B 17/10; C08J 5/18
[52] U.S. Cl. .............. 428/220; 264/175; 264/176.1; 428/437; 524/95; 524/100; 524/503
[58] Field of Search ........................ 524/95, 100, 503; 264/175, 176.1; 428/220, 437

[56] References Cited

U.S. PATENT DOCUMENTS

| | | | |
|---|---|---|---|
| 3,823,113 | 7/1974 | Reisman | 524/91 |
| 4,162,254 | 7/1979 | Irick, Jr. et al. | 548/224 |
| 5,384,346 | 1/1995 | Gutweiler et al. | 524/100 |

FOREIGN PATENT DOCUMENTS

| | | |
|---|---|---|
| 17363/83 | 2/1984 | Australia . |
| 1266740 | 3/1990 | Canada . |
| 0357324 | 3/1990 | European Pat. Off. . |
| 0568999 | 11/1993 | European Pat. Off. . |
| 59-041383 | 3/1984 | Japan . |

OTHER PUBLICATIONS

Modern Plastics Encyclopedia, 1981–1982, pp. 710–719.

*Primary Examiner*—D. S. Nakarani
*Attorney, Agent, or Firm*—Foley & Lardner

[57] ABSTRACT

A plasticized polyvinylbutyral film comprising a plasticizer, polyvinylbutyral, and an optical brightener in an amount effective to improve the optical properties and reduce the yellowing of the film. The resulting films are useful as intermediate films in multilayer laminated glass panes, including silicate-containing panes.

17 Claims, No Drawings

POLYVINYLBUTYRAL FILMS HAVING IMPROVED OPTICAL PROPERTIES

BACKGROUND OF THE INVENTION

1. Field of the Invention

The present invention relates to plasticized polyvinylbutyral films. The invention also relates to the production of such films and to methods of using such films, for example, in multilayer laminated glass panes.

2. Description of Related Art

Plasticizer-containing polyvinylbutyrals long have been processed in large amounts by thermoplastic methods and in particular have been extruded to make films. Such films are distinguished by outstanding mechanical properties and are used as intermediate layers in multilayer laminated glass panes, preferably for vehicle glass panes, architectural glasses for the building sector, and bullet-proof glass panes.

One disadvantage of the polyvinylbutyrals (PVBs) is their high sensitivity to oxidation, particularly at high temperatures, in comparison with other polymers which can be used industrially, and their instability and sensitivity to hydrolysis in the presence of acids. PVBs are therefore advantageously stabilized before or during their processing, preferably by thermoplastic methods, by the addition of anti-oxidants, preferably phenols. Furthermore, a small amount of alkali metal hydroxide is often added to prevent acid hydrolysis.

Since films of plasticized polyvinylbutyrals frequently exhibit excessively strong adhesion to inorganic glasses, adhesion-reducing substances, for example, alkaline salts, such as potassium acetate, may be added to the PVB, before or during the production of the films, to reduce this adhesion. However, it is known that the addition of such alkaline anti-adhesion agents and the high melt temperatures of >180° C. which are to be used in the extrusion can lead to considerably discolored plasticized PVB films.

A large number of experiments and techniques which had the aim of reducing the discolorations of PVB films have therefore already been disclosed. U.S. Pat. No. 3,823,113 discloses the additional stabilization of PVB by a benzotriazole derivative. DE-C 33 47 040 and DE-A 32 28 076 describe the use of a combination of a phenolic anti-oxidant and a phosphite for PVB stabilization. However, it has been found that only poor or unsatisfactory stabilization results can be achieved by the methods described in the above-mentioned publications. In particular, PVB stabilization by means of phosphite may present problems under long-term conditions. Phosphites are known to undergo hydrolysis under the action of alkali and hence to release phosphorous acid, which may then lead to the degradation of the PVB or contribute to its degradation.

European Patent Application EP-A 0568 999 describes the stabilization of PVBs with special polynuclear phenols, and the combination of these phenols with synergistic nitrogen-, sulfur- or phosphorus-containing costabilizers. The thermoplastic processing of these PVBs leads to laminated films which exhibit substantially reduced yellowing compared with PVBs known to date. Although the laminated films thus produced represent a substantial improvement over the prior art, the optical properties of the film have to meet even higher requirements for many applications, especially in the case of multiple laminates for bullet-proof glasses.

SUMMARY OF THE INVENTION

It was therefore an object of the present invention to provide polyvinylbutyral films which have lower yellowness indices compared with the prior art.

It was also an object of the present invention to provide methods of making such films and methods of using such films.

In accordance with these objects, there has been provided, in accordance with a first aspect of the present invention, a plasticized polyvinylbutyral film comprising a plasticizer, polyvinylbutyral, and optical brighteners in an amount effective to improve the optical properties and reduce the yellowing of the film.

In accordance with a second aspect of the present invention, there has been provided a process for preparing plasticized polyvinylbutyral films comprising the steps of dissolving or suspending optical brighteners in the plasticizer, mixing the plasticizers and optical brighteners with polyvinylbutyral to form plasticized polyvinylbutyral, and shaping the plasticized polyvinylbutyral to form a film.

In accordance with a third aspect of the present invention there has been provided multilayer laminated glass panes comprising as an intermediate layer, a polyvinylbutyral film as described above.

Further aspects, features, and advantages of the present invention will become apparent from the detailed description of preferred embodiments which follows.

DETAILED DESCRIPTION OF THE PREFERRED EMBODIMENTS

Surprisingly, it now has been found that the addition of optical brighteners to plasticized PVB materials and the processing thereof by a thermoplastic method to give flat films results in laminated films which, in the finished glass laminate, possess substantially reduced yellowness, i.e., greater whiteness, which is particularly important and advantageous for their use in silicate-containing safety laminated glass panes. The observed advantageous effect of the optical brighteners on the optical properties of the polyvinylbutyral laminated films according to the invention and of the laminated glass panes produced therefrom is all the more surprising since it is known that silicate-containing glasses have high UV absorption which counteracts the fluorescent effect of the optical brighteners.

According to the invention, all known and commercially available optical brighteners may be used as yellowness reducers in polyvinylbutyral films. The optical brighteners may be used alone or in combination and are used in any amount effective to improve the desired optical properties and anti-yellowing. This effective amount will depend upon the particular brightener, polymer, and plasticizer used.

It is known that optical brighteners are organic substances which contain systems of conjugated double bonds or multiple bonds in which hetero atoms may also be included, and have fluorescence properties. On exposure, the molecules absorb invisible ultraviolet light (up to 380 nm) and emit visible blue light (about 450 nm). Optical brighteners are used wherever a troublesome yellowish tinge in the color of the substrate is caused by absorption of short-wavelength visible light on or in a substrate. The bluish fluorescent emission of an optical brightener ensures that the blue component absorbed by the substrate and therefore absent in the reflected light of the yellowish substrate is supplemented, so that a radiant white material results. Overdoses of the optical brighteners frequently lead to the material having a bluish tinge. Optical brighteners have been used to date particularly for textiles, in detergents and for paper.

Examples of useful optical brighteners are derivatives of stilbene, coumarine, 1,3-diphenylpyrazoline, naphthalimide and benzoxazole. Stilbene derivatives and benzoxazole derivatives are preferably used as optical brighteners in the plasticized polyvinylbutyral films according to the invention, for instance disodium 4(2H-naphto[1,2-d]triazol-2-yl) stilbene-2-sulfonate and disodium 4,4'-bis(4-anilino-6-morpholino -S-triazin-2-ylamino)-2.2'-stilbene disulfonate. Preferred commercially available optical brighteners include, for example, Blankophor PSG® (stilbene derivative) from Bayer AG, Uvitex FP® (stilbene derivative) and Uvitex OB® (benzoxazole derivative) from Ciba-Geigy AG.

The optical brighteners are added to the PVB in any desired manner. Preferably they are added to the PVB in solution in the plasticizer or suspended in the plasticizer, preferably before or during the plasticizing process or during the extrusion. The optical brightener/plasticizer solution can be mixed with the PVB before entry into an extruder or in the screw channel of the extruder.

The laminated polyvinylbutyral films according to the invention also may contain further customary light stabilizers in the usual amounts, preferably UV stabilizers, in particular, benzotriazole derivatives, and further conventional anti-adhesion agents and other additives, which are mixed with the PVB in the usual manner.

The amount of optical brighteners used in the laminated polyvinylbutyral films according to the invention varies depending on the particular ingredients used and the intended use of the films. This effective amount is generally 0.00001 to 0.1% by weight, in particular 0.0001 to 0.05% by weight, based on the weight of the PVB/plasticizer mixture.

With these contents of optical brighteners, the plasticized laminated polyvinylbutyral films according to the invention are substantially superior to comparable plasticized laminated polyvinylbutyral films of the prior art. Use of the inventive films lead in particular to laminated films exhibiting comparatively greatly reduced yellowing and substantially improved optical quality and optical translucence.

The optical brighteners can be added to all polyvinylbutyral types which, in plasticized form, can be processed by a thermoplastic method such as extrusion to give plasticized translucent flat PVB films. The polyvinylbutyrals preferred for this purpose have a content of vinyl alcohol monomer units of preferably 17 to 29% by weight, in particular, 18.5 to 24% by weight, particularly preferably 19 to 22% by weight, based on the PVB. The viscosity of the 5% strength by weight ethanolic solutions of the PVBs (measured according to DIN 53015) at 23° C. is preferably 10 to 200 mPa.s, in particular 50 to 100 mPa.s.

The plasticizers used may be all known plasticizers or plasticizer mixtures which are compatible with polyvinylbutyral and suitable for the plasticizing thereof. A list of commercially available plasticizers which contains data on the compatibility with polyvinylbutyral appears in, for example, the publication Modern Plastics Encyclopedia 1981/1982, pages 710 to 719 which is hereby incorporated by reference. Preferred plasticizers are, for example, the diesters of aliphatic diols, in particular, of aliphatic polyetherdiols or polyetherpolyols, with aliphatic carboxylic acids, preferably diesters of polyalkylene oxides. In particular, diesters of di-, tri- and tetraethylene glycol with aliphatic ($C_6$–$C_{10}$)-carboxylic acids, preferably 2-ethylbutyric acid and n-heptanoic acid, and furthermore diesters of aliphatic or aromatic ($C_2$–$C_{18}$)-dicarboxylic acids, preferably adipic, sebacic and phthalic acid, with aliphatic ($C_4$–$C_{12}$)-alcohols, preferably dihexyl adipate.

For plasticizing PVB, the plasticizers are used in amounts sufficient to impart the desired plasticizing effect. The amount may be preferably in the range from 20 to 50% by weight, in particular, 23 to 30% by weight, based on the weight of the PVB/plasticizer mixture.

The polyvinylbutyrals plasticized with the addition of optical brighteners may be processed in any desired way to produce a film. Generally they are extruded, preferably by a thermoplastic method, through slot dies to give preferably 0.2 to 2 mm, in particular 0.3 to 0.8 mm, thick translucent flat films. The thickness of the film can be varied depending on intended use. The extrusion temperature of the extrusion molding materials is in the customary range, preferably between 140° and 250° C., but higher temperatures may also be reached for a short time. Flat films can also be produced by shaping the plasticized PVB molding materials according to the invention by a thermoplastic method on a heatable three-roll mill or on a calendar.

The extrusion molding materials may contain further additives, such as, for example, small amounts of alkali, preferably 0.001 to 0.1% by weight, based on the PVB, of alkali metal hydroxide or alkaline alkali metal salt, for stabilizing the PVB to acidic hydrolysis. This alkali content is usually also referred to as the alkali titer of the PVB.

The plasticized PVB extrusion molding materials may furthermore contain known anti-adhesion agents in customary amounts, such as, for example, alkali metal salts or alkaline earth metal salts of carboxylic acids, in particular, potassium salts or magnesium salts of formic acid or of acetic acid, and alkali metal salts or alkaline earth metal salts of saturated dicarboxylic acids or magnesium acetylacetonate and various silanes or siloxanes, for example, 3-(methyltriethyleneglycoxy)propylsilane trismethyltriethylene glycol ester. The amount of these anti-adhesion agents used is preferably in the range from 0.001 to 0.2% by weight, based on the PVB/plasticizer mixture. The molding mixture may furthermore contain other customary light stabilizers, for example, benzotriazole derivatives.

The PVB laminated films according to the invention may be used in any desired manner and in particular where thermoplastic films are useful. In particular, the plasticized polyvinylbutyrals films, are useful as intermediate layers in the production of laminated glass panes from inorganic glass panes. The panes may be produced and constructed in any desired manner and can be useful as vehicle glass panes, glass panes for ships, aircraft glass panes, architectural glass panes for the building sector, safety glass panes and/or bullet-proof glass panes which comprise for instance glass/PVB film/glass. High-quality laminated glasses having substantially reduced yellowing and surprisingly advantageous performance characteristics are obtained.

The invention is illustrated in detail by the Examples which follow.

EXAMPLES 1 TO 10

Production and testing of plasticized polyvinylbutyral films having different contents of optical brighteners

EXAMPLES 1 TO 5

Use of stilbene derivatives as optical brighteners

In each of Examples 1 to 5, a PVB having a content of vinyl alcohol monomer units of 20.5% by weight, based on the PVB, an alkali titer of 15 ml of n/100 HCl per 100 g of PVB and a viscosity of the 5% strength by weight ethanolic PVB solution, at 23° C. of 61 mPa.s (measured according to DIN 53015) is mixed with 26% by weight, based on the PVB/plasticizer mixture, of the plasticizer triethylene glycol di-n-heptanoate and plasticized, and in addition different amounts, as stated in Examples 1 to 5 and based in each case on the PVB/plasticizer mixture, of the commercially available optical brightener Blankophor PSG® (stilbene derivative, manufacturer: Bayer AG) in solution in the plasticizer used (Examples 1 to 3) or the commercially available optical brightener Uvitex FP® (stilbene derivative, manufacturer: Ciba-Geigy AG) suspended in the plasticizer used (Examples 4 and 5) are admixed and the plasticized PVB material is extruded in a Haake® twin-screw extruder (manufacturer: Haake)® at a melt temperature of 200° C., in each case to give a 0.8 mm thick flat film.

The yellowness of the films obtained is determined essentially by the method ASTM-D-1925 using silicate-containing laminated glasses which in each case contain the films as an intermediate layer, with elimination of the yellowness index of the film-free glass pane. The resulting measured value is the "Yellowness Index" (YI). In this context, the difference $\Delta YI$, as obtained from the measured value for the laminated glass minus the measured value for the film-free glass sheets of the laminated glass, is stated in the present examples.

The laminated glass is produced by a laboratory method using a high-speed press, in which the glass sheets are pressed with the intermediate laminated films at 150° C. and a holding time of 3 minutes at 12 bar. The YI value determined for the film-free glass sheets used is subtracted from the YI value determined for the glass laminate obtained by pressing with the particular films, and the $\Delta YI$ value stated in each case is thus obtained.

The $\Delta YI$ values decrease with decreasing yellowness or decreasing yellowing of the films. $\Delta YI$ values of $\leq 2$ are preferred, those of $\leq 1.8$ being particularly preferred.

The following $\Delta YI$ values are obtained in Examples 1 to 5:

Example 1: Addition of 0.0001% by weight of Blankophor PSG® $\Delta YI=0.73$

Example 2: Addition of 0.001% by weight Blankophor PSG® $\Delta YI=0.63$

Example 3: Addition of 0.01% by weight of Blankophor PSG® $\Delta YI=-0.24$

The negative $\Delta YI$ values obtained in Example 3 and in the subsequent Examples 5 and 10 are due to excessively high concentrations of optical brighteners, which leads to overcompensation of the absent blue light component and hence to a bluish tinge of the film.

Example 4: Addition of 0.0001% by weight of Uvitex FP® $\Delta YI=1.69$

Example 5: Addition of 0.001% by weight of Uvitex FP® $\Delta YI=-0.63$

COMPARATIVE EXAMPLE 1

The procedure is as described in Examples 1 to 5, with the modification that the plasticized PVB film is produced without the addition of an optical brightener.

The $\Delta YI$ value determined is 2.23.

EXAMPLES 6 TO 8

Use of a benzoxazole derivative as optical brightener

The procedure is as described in Examples 1 to 5, with the modification that, instead of Blankophor PSG® or Uvitex FP®, the optical brightener Uvitex OB® (benzoxazole derivative, manufacturer: Ciba-Geigy AG), in solution in the plasticizer, is mixed with the polyvinylbutyral in various amounts.

The following $\Delta YI$ values are obtained:

Example 6: Addition of 0.00005% by weight of Uvitex OB® $\Delta YI=1.07$

Example 7: Addition of 0.0002% by weight of Uvitex OB® $\Delta YI=0.84$

Example 8: Addition of 0.001% by weight of Uvitex OB® $\Delta YI=0.44$

EXAMPLES 9 AND 10

Use of an optical brightener together with a UV absorber

The procedure is as described in Examples 6 to 8, with the modification that, in addition to the optical brightener Uvitex OB®, in solution in the plasticizer, 0.15% by weight, based on the PVB/plasticizer mixture, of the UV absorber Tinuvin® P (manufacturer: Ciba-Geigy AG) is also added to the polyvinylbutyral in each case.

The following $\Delta YI$ values are obtained:

Example 9: Addition of 0.001% by weight of Uvitex OB $\Delta YI=1.05$

Example 10: Addition of 0.01% by weight of Uvitex OB $\Delta YI=-0.17$

It is surprising that a substantial reduction in the yellowing in the film results even together with a customarily used UV absorber capable of absorbing the UV light required by the optical brightener for its activity.

What is claimed is:

1. A plasticized polyvinylbutyral film comprising plasticizer, polyvinylbutyral, and an amount of optical brightener effective to improve the optical properties and reduce the yellowing of the film, wherein the optical brightener is selected from the group consisting of 4,4'-bis(2-methoxystyryl) diphenyl; 2,5-bis(7-tert.-butyl benzoxazol-2-yl) thiophene; disodium 4(2H-naphto(1,2-d) triazol-2-yl) stilbene-2-sulfonate; and disodium 4,4 '-bis (4-anilano-6-morpholine-S-triazine -2-ylamino) -2.2'-stilbene disulfonate.

2. A plasticized polyvinylbutyral film as claimed in claim 1, further comprising one or more additives selected from the group consisting of antioxidants, light stabilizers, antiadhesion agents, and hydrolysis inhibitors.

3. A plasticized polyvinylbutyral film as claimed in claim 1, comprising 0.00001 to 0.1% by weight of optical brightener based on the total weight of plasticizer and polyvinylbutyral.

4. A plasticized polyvinylbutyral film as claimed in claim 1, comprising 20 to 50% by weight of plasticizer based on the total weight of polyvinylbutyral and plasticizer.

5. A plasticized polyvinylbutyral film as claimed in claim 1, wherein the polyvinylbutyral has a content of vinyl alcohol monomer units of 17 to 29% by weight, based on the weight of the polyvinylbutyral.

6. A plasticized polyvinylbutyral film as claimed in claim 1, which is a flat film having a thickness of 0.2 to 2 mm.

7. A plasticized polyvinylbutyral film as claimed in claim 1, comprising 0.0001 to 0.05% by weight of optical brightener based on the total weight of plasticizer and polyvinylbutyral.

8. A plasticized polyvinylbutyral film as claimed in claim 1, wherein the polyvinylbutyral has a content of vinyl alcohol monomer units of 19 to 22% by weight based on the weight of the polyvinylbutyral.

9. A plasticized polyvinylbutyral film as claimed in claim 1, further comprising alkali in an amount effective to stabilize the polyvinylbutyral against acid hydrolysis.

10. A plasticized polyvinylbutyral film as claimed in claim 1, further comprising anti-adhesion agents.

11. A plasticized polyvinylbutyral film as claimed in claim 1, further comprising a UV absorber.

12. A plasticized polyvinylbutyral film as claimed in claim 1, produced by a process comprising (a) dissolving or suspending optical brighteners in the plasticizer, (b) mixing the plasticizers and optical brighteners with polyvinylbutyral to form plasticized polyvinylbutyral, and (c) shaping the plasticized polyvinylbutyral to form a film.

13. A plasticized polyvinylbutyral film as claimed in claim 12, wherein the shaping comprises extrusion or calendaring.

14. A plasticized polyvinylbutyral film as claimed in claim 1, which consists essentially of the recited components.

15. A plasticized polyvinylbutyral film as claimed in claim 1, which has a yellowness index of less than 2.

16. A process for the production of a plasticized polyvinylbutyral film as claimed in claim 1, comprising the steps of (a) dissolving or suspending the optical brightener in the plasticizer, (b) mixing the plasticizer and optical brightener with polyvinylbutyral to form plasticized polyvinylbutyral, and (c) shaping the plasticized polyvinylbutyral to form a film.

17. A process as claimed in claim 16, wherein the shaping comprises extrusion or calendaring.

* * * * *